United States Patent

[11] 3,603,448

[72] Inventors Tohei Okano;
  Takehiko Kannari, both of Osaka, Japan
[21] Appl. No. 880,134
[22] Filed Nov. 26, 1969
[45] Patented Sept. 7, 1971
[73] Assignee The Tsubakimoto Chain Manufacturing Co., Ltd.
  Jotoku, Osaka, Japan
[32] Priority Jan. 6, 1969
[33] Japan
[31] 32/1969

[54] CONVEYER APPARATUS
  6 Claims, 11 Drawing Figs.
[52] U.S. Cl. ............................................. 198/162
[51] Int. Cl. ............................................ B65g 15/14
[50] Field of Search .................................. 198/162, 165

[56] References Cited
  UNITED STATES PATENTS
2,971,632  2/1961  Sauvee ........................ 198/165

Primary Examiner—Edward A. Sroka
Attorney—Woodhams, Blanchard and Flynn

ABSTRACT: The present invention relates to a conveyor apparatus which comprises an endless slat conveyor which provides an air suction chamber, a pair of chains surrounding the air suction chamber, a plurality of slats extended between the chains, the slats having air suction ports and, if required, an elastic plate, and a plurality of driving sprockets to drive the endless slat conveyor; an endless backup belt which provides a pair of toothed belts (e.g. chains), the belts being maintained in intimate contact with the edges of the slats, and an airtight wide membrane extended loosely between a pair of the toothed belts (e.g. chains); and an air suction device which has an air suction tube connected to the air suction chamber and a blower. This conveyor apparatus is made up of a horizontal part and a vertical or inclined part. Articles supplied on the slats of the horizontal part are covered entirely by the airtight membrane and the membrane is sucked to the surface of the articles when the pressure in the space formed between the slat conveyor and the backup belt drops in the negative. Consequently, the articles are able to be conveyed in the vertical or inclined direction, while holding securely in a sense sandwiched between the slat conveyor and the backup belt.

PATENTED SEP 7 1971

INVENTORS
TAKEHIKO KANNARI
TOHEI OKANO

BY *Woodhams, Blanchard & Flynn*

ATTORNEYS

INVENTORS
TAKEHIKO KANNARI
TOHEI OKANO
BY Worthing, Blanchard & Flynn
ATTORNEYS

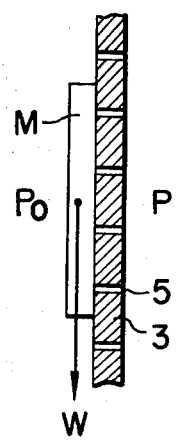
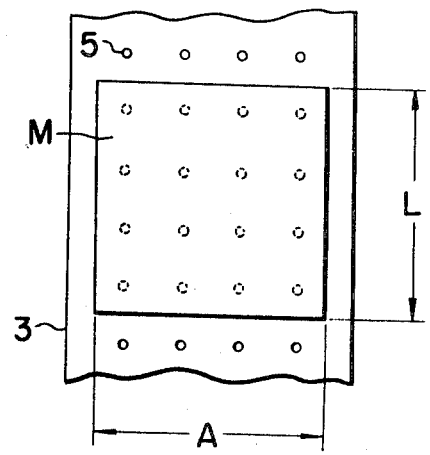
FIG. 8  FIG. 9
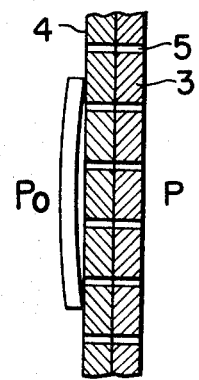
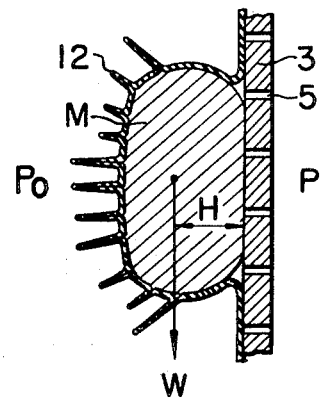
FIG. 10  FIG. 11

CONVEYER APPARATUS

BACKGROUND OF THE INVENTION

When shaped articles, such as various sized packed articles boxes or bags, etc., or plate-shaped articles, such as metal or plastics, etc., are conveyed vertically, there has not, hitherto, been found a conveyor apparatus which conveys these articles in succession along the vertical or inclined passage, while securely holding the articles in position as they are conveyed, without giving any kinds of damages to the articles.

SUMMARY OF THE INVENTION

This invention relates to a conveyor apparatus which comprises an endless slat conveyor which provides an air suction chamber, a pair of chains surrounding the air suction chamber and a plurality of slats with air suction ports extended between the chains; an endless backup belt which provides a pair of toothed belts (e.g. chains) and an airtight wide membrane extended loosely between a pair of belts; and an air suction device.

An object of the present invention is to provide a conveyor apparatus which is able to convey various sized or shaped articles safely and successively due to covering the articles put on an endless slat conveyor by an endless backup belt.

Another object of the invention is to provide a conveyor apparatus in which articles are sucked to an endless slat conveyor by an air suction device and are conveyed along the vertical passage in order to save space and to reduce conveying time.

Moreover, in a case that an elastic plate is secured on an endless slat conveyor, articles can be conveyed without any damage, as the articles are put on the soft surface of the elastic plate.

BRIEF DESCRIPTION OF THE DRAWINGS

This invention will now be further described with reference to the accompanying drawings in which:

FIGS. 8, 9, 10 and 11 are views describing the principle of operation of the invention.

Referring to FIGS. 1 and 2, a conveyor apparatus according to the present invention comprises an endless slat conveyor which provides an air suction chamber 1, a pair of chains 2 surrounding the air suction chamber 1, a plurality of slats 3 extending between the chains 2, and driving sprockets 9 for driving the endless slat conveyor; an endless backup belt which comprises a pair of toothed belts 11 (e.g. a pair of chains), the belts 11 being maintained in intimate contact with the edges of the slats 3, and an airtight soft and wide membrane 112 extending loosely between the belts 11; and an air suction device which provides an air suction tube 15 connected to the air suction chamber 1 and a blower 16. The slat conveyor, backup belt, driving mechanism 22 of slat conveyor and a motor 21 are respectively mounted on a frame 20.

Figure 1:
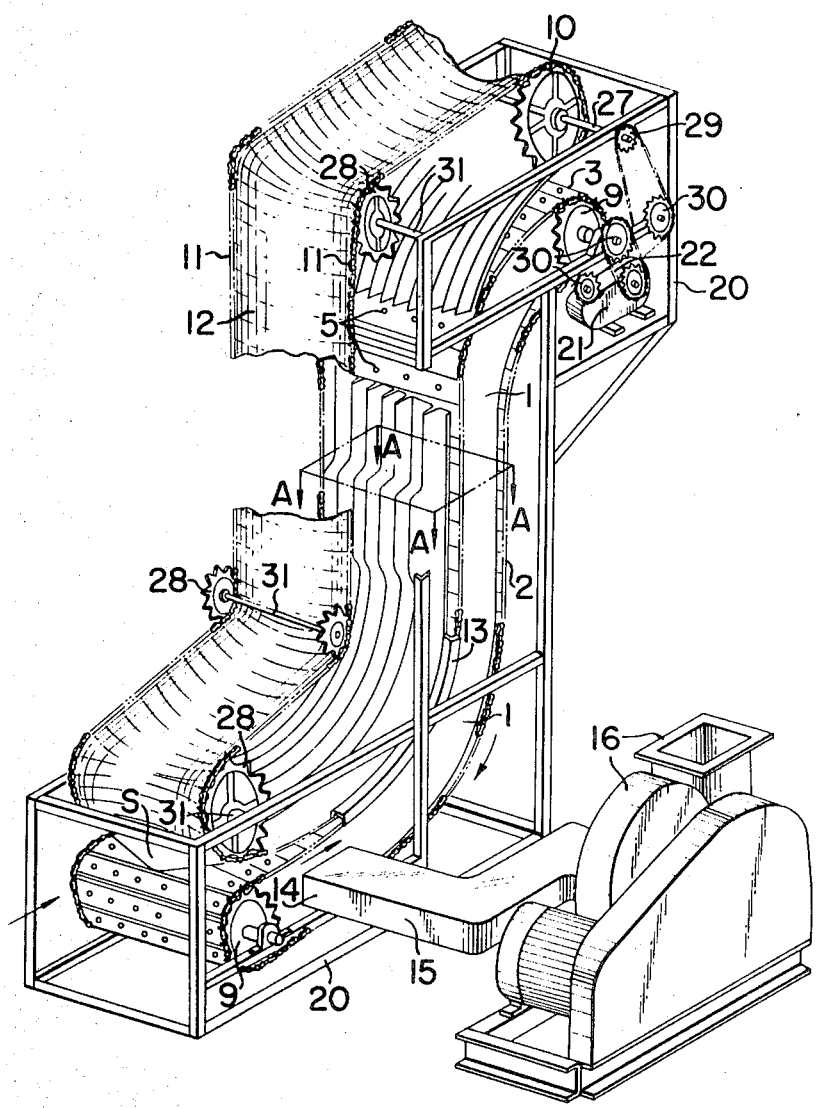
FIG. 1 is a perspective view of a conveyor apparatus of the invention.
Figure 2:
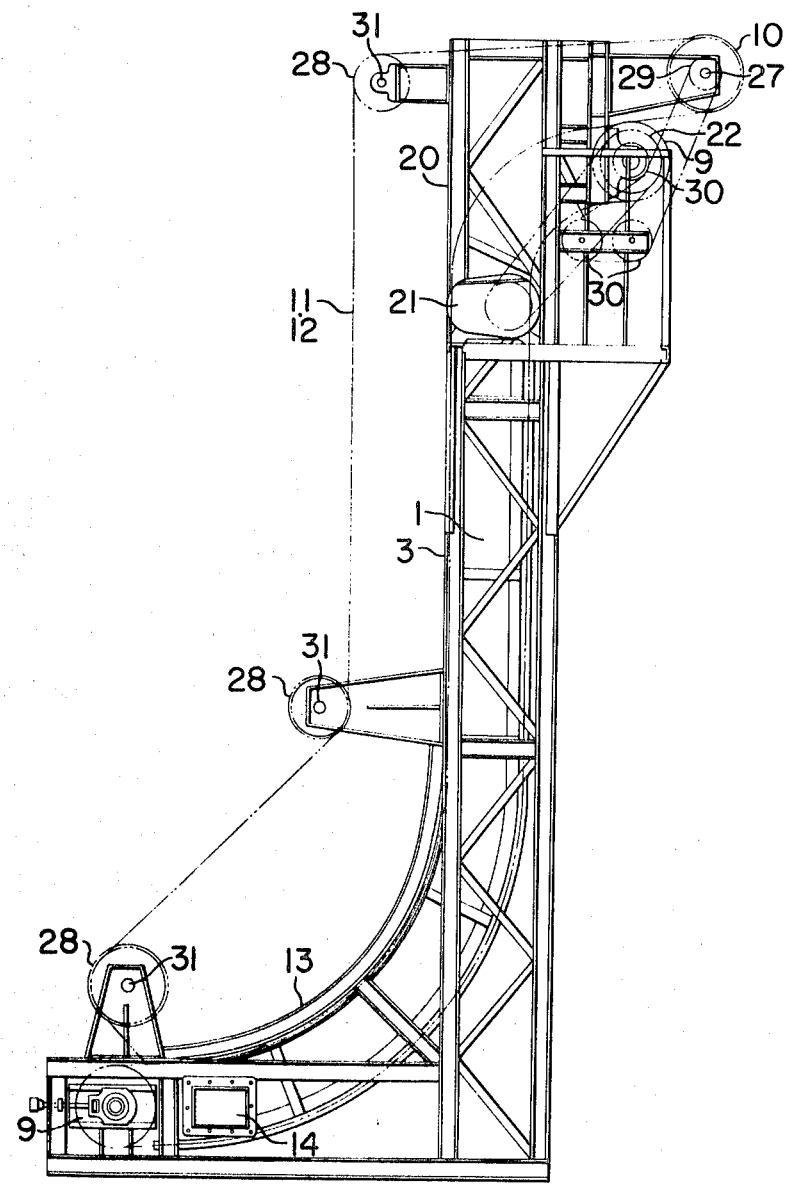
FIG. 2 is a side view of FIG. 1.
Figure 3:
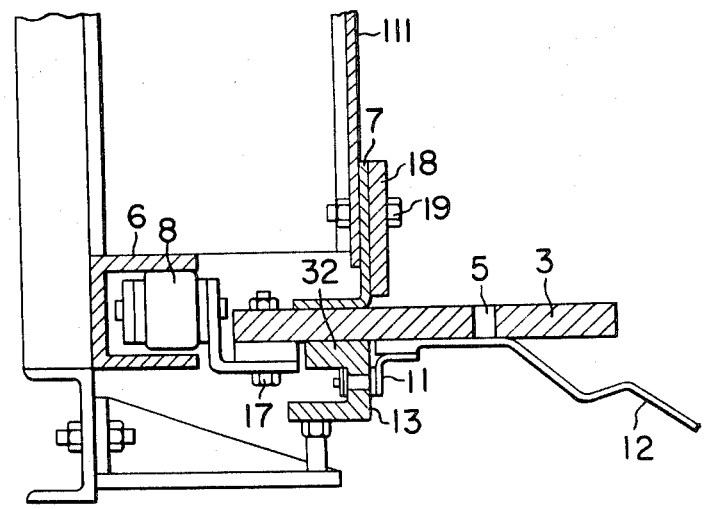
FIG. 3 illustrates an air suction chamber in detail
Figure 4:
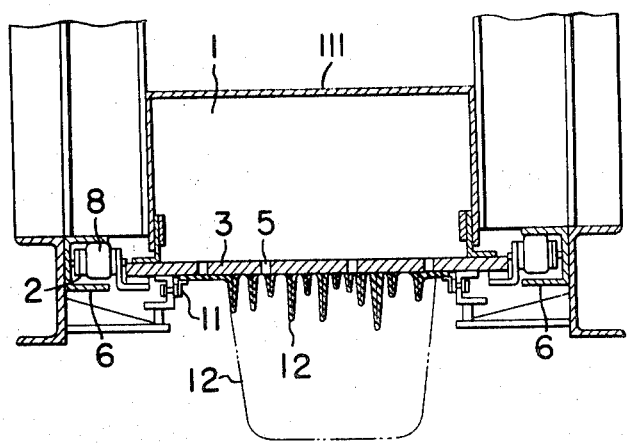
FIGS. 4 and 5 are sectional views taken along the line A—A of FIG. 1.

As is readily apparent from FIGS. 1–4 and more particularly from FIGS. 3 and 4, the chains 2 of endless slat conveyor are extended between sprockets 9 and 9 to surround the air suction chamber 1. Rollers 8 of chain 2 are guided by a guide rail 6 mounted on the frame 20 as shown in FIG. 3. The both edges of slats 3 are connected to the rollers 8 through L-shaped members by bolts 17, the slat 3 having air suction ports or slits 5. The air suction chamber 1 is enclosed by a channel-shaped member 111 at the left, right and back sides. Airtight members 7 are secured to the both sides of channel-shaped members facing to the slat 3 by bolts 19 through plates 18, the extremity of airtight member 7 being contacted to the surface of slat 3. On the underside of slat 3, the airtight membrane 12 is contacted tightly as shown in FIG. 3. Thus, the channel-shaped member 111, the airtight member 7, the slat 3 and the membrance 12 make the air suction chamber 1 airtight.

The backup belt consists of a couple of endless toothed belts 11 and the endless membrane 12, and is extended between gears 10 and 28 through intermediate gears 28 as shown in FIGS. 1 and 2. The airtight membrane 12 is wide and soft so as to be deformed easily in obedience to the shape of an article to be wrapped. The membrane 12 is extended loosely between a pair of the belts 11 as shown in phantom line in FIG. 4. The teeth secured to the belt 11 are held between a rail 13 provided on the frame 20 and a guide member 32 attached to the underside of the slat 3. Thus the movement of backup belt in the direction of left and right is limited.

The toothed wheels (e.g. sprockets) 10 and 28 are respectively secured to projecting shafts 27 and 31. The shaft 27 is connected to a main shaft 24 through sprockets 29 and 30 as shown in FIGS. 1 and 2. The sprockets 29 and 30 are designed to drive the belts 12 and the chains 2 with the same speed.

Figure 6:
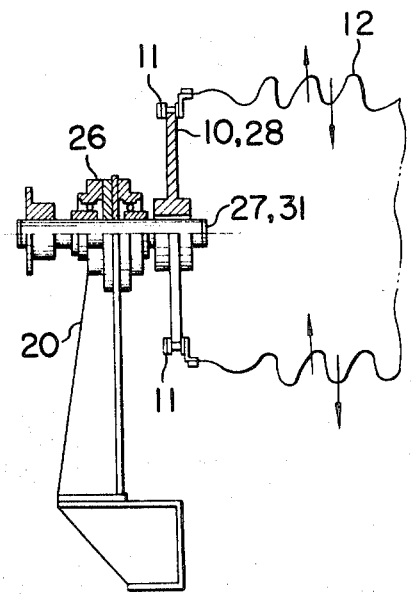
FIGS. 6 and 7 are sectional views of a tooth of an endless backup belt and a sprocket and a bearing of an endless slat conveyor.
Figure 7:
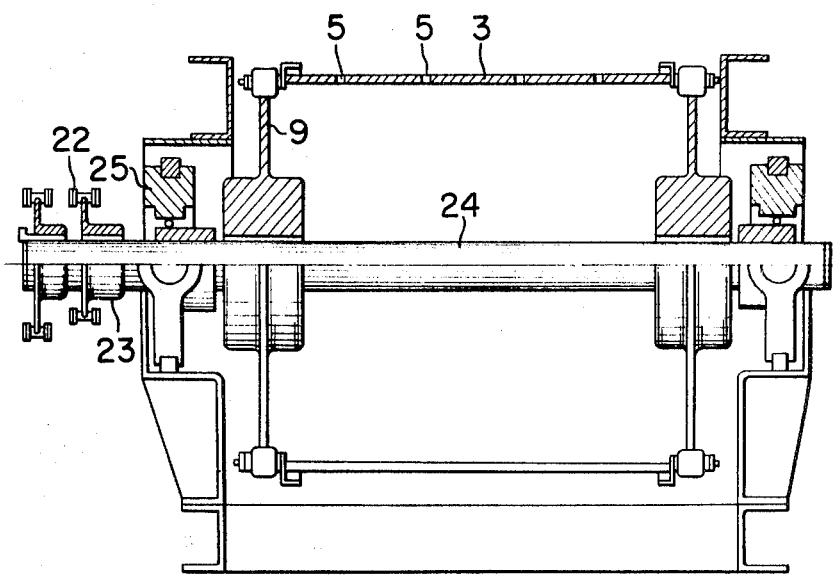

Referring to FIG. 6, the projecting shaft 27 or 31 is mounted on bearings 26 provided on the frame 20, and has the toothed wheel (e.g. sprocket) 10 or 28 on one hand and a wheel on the other hand. Since the projecting shaft 27 or 31 is free at the right or left end respectively, the membrance 12 connected to the shaft 27 or 31 through the toothed wheel (e.g. sprocket) 10 or 28 is flexible freely in the direction of the arrows within the width of the belt 11 in FIG. 6.

The air suction tube 15 connected to the suction port of blower 16 is connected to the suction side 14 of the air chamber 1 in order to suck air from the air chamber 1 which is closed up airtightly by the channel-shaped member, the slats 3 and the other members. Accordingly, the air suction of blower 16 results in sucking the airtight membrane 12 of the backup belt as shown in phantom line in FIG. 4, or sucking the membrane 12 with articles M as shown in solid line in FIG. 5, to the surface of slats 3. The principle of the suction operation in accordance with the present invention is as follows.

Referring to FIG. 8, in a case where a smooth plate-shaped article M is disposed to the left side (when viewed as in the drawing) of a vertical suction plate 3 which has air suction ports 5, and when the pressure in a closed room which is provided on the right side of the plate 3 is dropped by air suction, the article M is pushed to the suction plate 3 by the force $(Po-P)AL$: where; $Po$ is the atmospheric pressure, $P$ is the pressure in the space A and L are the sizes of article M as shown in FIG. 9.

Then, a condition in which the article is to be held on the suction plate 3 may be written as:

$$\mu(Po-P)AL \geq W \quad (1)$$

where $\mu$ is the coefficient of friction between the article $M$ and the suction plate 3 $W$ is the weight of articles M. That is, if the pressure P enough to satisfy the formula (1) is given, the article M is able to be held on the suction plate 3.

However, as the article M has unevenness on the surface to some extent even if it is seen to be smooth at a glance, there are inevitably some extremely small space between the article M and the suction plate 3. Then the sufficient condition of suction is not suitable in the formula (1) but may be as follows:

$$\alpha\mu(Po-P)AL \geq W \quad (2)$$

where $\alpha$ is the coefficient which is decided by the shape and the size of space between the article M and the suction plate 3. Judging from the formula (2), it is easily understood that it is economical and desirable to approximate the value $\alpha$ to the value 1. One of the devices to attain the object mentioned above is shown in FIG. 10. A soft and elastic member 4 is stuck on the left side of suction plate 3 and a plate-shaped article M having uneven surface is disposed on the elastic member 4. In this case, as the negative pressure exerted to the article M pushes it into the elastic member 4, the article M and the elastic member 4 are sucked toward each other as if they were completely smooth, or in the similar condition. However, in a case that the unevenness of article is so large, it is difficult to find such a suitable elastic member.

Accordingly, a basic conception of this invention is to cover an article M completely with an airtight soft and wide membrance 12 for sucking the article M to the suction plate 3 as shown in FIG. 11. Under this condition, there is produced the closed space between the membrane 12 covered on the article and the suction plate 3. When air in the room is sucked, the pressure in the closed space drops, thereby the membrane 12 pushes the article M to the suction plate 3.

In the example shown above, the condition of equilibrium of forces that the article does not fall down from the suction plate may be as follows:

$$\mu(Po-P)AL \geq W \quad (3)$$

where $\mu$; $Po$, $P$, $W$, $A$ and $L$ are identical in the formula (1).

In this case, it is necessarily to consider that the article M is inclined to revolve and fall down around the corner by the counterclockwise movement (when viewed as in the FIG. 11). The condition of equilibrium of movement to prevent it may be as follows:

$$\tfrac{1}{2}(Po-P)AL^2 > WH \quad (4)$$

where $H$ is the length between the center of gravity of the article M and the suction plate 3. Therefore, the condition in which the article is able to be held on the suction plate is to satisfy the conditions of equilibrium of the formula (1) and (2) simultaneously.

When the blower 16 starts its operation in FIGS. 1 and 2, air in the air chamber 1 is sucked into the blower through the air suction tube 15 and the pressure P in the air chamber becomes lower than the atmospheric pressure. Consequently, the pressure equivalent to the amount that the negative pressure in the air chamber 1 times the whole area of the slats 3 is exerted on the slats. Then the soft and wide membrane 12, extending loosely between the left and right belts 11 with gear teeth in parallel with the slats 3, is sucked to the slats 3 through the air suction ports 5.

Referring to FIG. 1, the down left portion of the slat conveyor is arranged horizontally, the slat conveyor being driven in the direction of the arrow (or in the opposite direction, if required). The toothed belt 11 on which the airtight wide and soft membrane 12 is loosely extended is guided by the sprockets 10 and 28 and the rail 13 provided on the frame 20. The article M carried on the slats 3 at the point S along the direction of the arrow advances between the sprockets 28 located on the left and right sides, while the airtight membrane 12 is covering the article therein. When advancing into the region of the rail 13, the article is completely wrapped up by the airtight membrane 12.

Figure 5:
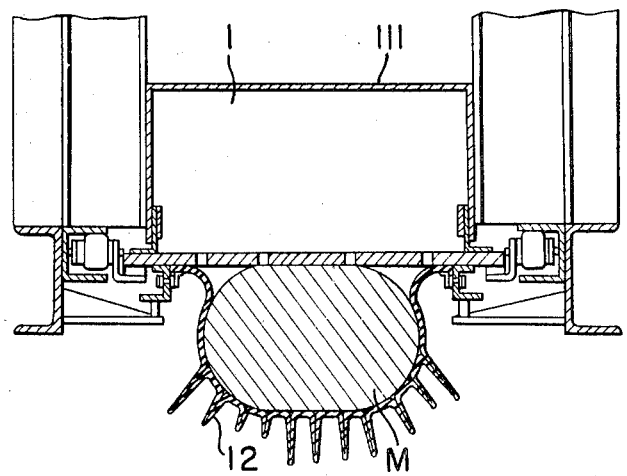

Thus, when covering the left and right sides, the front and back sides and the bottom of the article M as shown in FIG. 5, the membrane 12 is sucked to the air chamber 1 in the state of wrapping the article M, this latter being pushed to the slats 3. Therefore, assuming the pressure in the air chamber is sucked so as to satisfy the conditions in the formulas (3) and (4), the article M is able to be held on the slats 3.

Then, when the sprockets 9 and 10 are driven by the motor 21, the toothed belt 11, the membrane 12 and the article M wrapped by the membrane 12 are moved together at the same speed.

The membrane 12 described above should be so soft and wide that it is able to cover different shapes of articles and to be sucked to the slats easily. Therefore, the membrane should have low air permeability durability for repeated bending and large tensile strength, and such nature should be constant for the change of temperature and the passage of time. For instance, chemical fiber textile coated with a rubberlike material, such as rubber or plastics is preferable.

In a case that an article to be conveyed is a plate which is not so thick, it is enough when the width of membrane is larger than the length which adds the width of plate to its thickness. In the case of solid articles, the width of which is H, it is suitable when the width of membrane for one of the articles is larger than the length which adds the width of article to 2H, and the length of membrane is larger than the length which adds the length of belt 11 to 2H.

The toothed belt 11 should be maintained in intimate contact with the left and right edges of the slats 3 and keep airtight. Moreover, they should be conveyed so as to be moved together with the slat conveyor and so not to produce the unbalance between the left and right edges. The teeth should be engaged with the teeth without slipping between them. It is convenient to use a well-known chain shown in FIG. 3, as the toothed belt.

Additionally, it is effective to use an elastic plate which is stuck on the slats 3. Soft material, such as foam rubber or plastics, is preferable as the elastic plate. This elastic plate prevents damage which occurs by the contact between the article M and the slats 3, and gets reliable suction by being contacted with the surface of article which has an unevenness.

While I have shown and described certain specific embodiment of my invention, I am aware that many modifications thereof are possible. My invention, therefore, is not to be limited to the precise details shown and described but is intended to cover all modifications coming within the scope of the appended claims.

We claim:

1. A conveyor apparatus, comprising:
conveyor means having wall means defining an air suction chamber having an open wall portion;
said conveyor means including movable, endless, flexible drive members and a plurality of slats extending between said drive members with said slats substantially closing said open wall portion of said suction chamber, said slats defining air suction openings extending between the external surface thereof and the interior of said suction chamber;
movable, endless, flexible, backup means disposed adjacent said conveyor means for creating a substantially airtight cover over an article disposed on and being conveyed by said slats, said endless backup means including endless flexible drive elements and an airtight, wide, endless flexible membrane extending loosely between said pair of endless elements, the opposite edges of said membrane being maintained in airtight engagement with the edges of said slats throughout the conveying reach of said conveyor means; and
air suction means connected to said air suction chamber for creating a suction therein to cause said flexible membrane to create an airtight cover over an article disposed on said slats for holding said article on said slats as it is conveyed by said conveyor means.

2. A conveyor apparatus according to claim 1, wherein said conveyor means includes an elastic plate secured to the external surface of said slats, said air suction openings extending through both said slats and said elastic plate.

3. A conveyor apparatus according to claim 1, wherein said endless flexible membrane is constructed at least in part of a flexible rubberlike material.

4. A conveyor apparatus according to claim 1, wherein said conveyor means and said backup means both include elongated inclined portions disposed adjacent one another for enabling articles to be conveyed between different elevations.

5. A conveyor apparatus according to claim 1, wherein said endless flexible drive members and said endless flexible drive elements comprise endless chainlike members disposed in engagement with rotatable toothed wheels for movably supporting said slats and said membrane.

6. A conveyor apparatus according to claim 1, wherein said wall means includes an elongated channel-shaped member disposed between and extending longitudinally of said endless drive members, the underside of the conveying reach of said conveyor means being disposed closely adjacent the open side of said channel-shaped member whereby said slats extend across said channel-shaped member and substantially close said open side thereof.